United States Patent
Guillard et al.

(10) Patent No.: US 10,634,425 B2
(45) Date of Patent: Apr. 28, 2020

(54) INTEGRATION OF INDUSTRIAL GAS SITE WITH LIQUID HYDROGEN PRODUCTION

(71) Applicant: L'Air Liquide, Societe Anonyme pour l'Etude et l'Exploitation des Procedes Georges Claude, Paris (FR)

(72) Inventors: Alain Guillard, Houston, TX (US); Pierre-Etienne Franc, Paris (FR); Michael A. Turney, Houston, TX (US); Kirill Andreev, Richmond, TX (US); Alexander Roesch, Katy, TX (US)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 457 days.

(21) Appl. No.: 15/414,155

(22) Filed: Jan. 24, 2017

(65) Prior Publication Data
US 2018/0038638 A1 Feb. 8, 2018

Related U.S. Application Data

(60) Provisional application No. 62/371,497, filed on Aug. 5, 2016.

(51) Int. Cl.
*F25J 1/00* (2006.01)
*F25J 1/02* (2006.01)
(Continued)

(52) U.S. Cl.
CPC ............ *F25J 1/001* (2013.01); *B01D 53/047* (2013.01); *C01B 3/34* (2013.01); *C01B 3/56* (2013.01);
(Continued)

(58) Field of Classification Search
CPC ...... B01D 53/047; F25J 1/001; F25J 3/04024; F25J 1/0236; F25J 1/0229; F25J 1/0022;
(Continued)

(56) References Cited

U.S. PATENT DOCUMENTS 2,983,585 A 5/1961 Smith
3,347,055 A 10/1967 Blanchard et al.
(Continued)

FOREIGN PATENT DOCUMENTS

CN 103 017 480 4/2013
CN 204 063 780 12/2014
(Continued)

OTHER PUBLICATIONS

Quack, "Conceptual Design of a High Efficiency Large Capacity Hydrogen Liquefier," Adv. Cryog. Eng., Proc. CEC, Madison 2001, AIP, vol. 613, 255-263—Abstract Only.
(Continued)

*Primary Examiner* — Kun Kai Ma
(74) *Attorney, Agent, or Firm* — Justin K. Murray (57) ABSTRACT

The method for producing liquid hydrogen can include the steps of: introducing pressurized natural gas from a high pressure natural gas pipeline to a gas processing unit under conditions effective for producing a purified hydrogen stream; and introducing the purified hydrogen stream to a hydrogen liquefaction unit under conditions effective to produce a liquid hydrogen stream, wherein the hydrogen liquefaction unit provides a warm temperature cooling and a cold temperature cooling to the purified hydrogen stream, wherein the warm temperature cooling is provided by utilizing letdown energy of a pressurized stream selected from the group consisting of a nitrogen stream sourced from a nitrogen pipeline, a natural gas stream sourced from the high pressure natural gas pipeline, an air gas sourced from an air
(Continued)

separation unit, and combinations thereof, wherein the cold temperature is provided by utilizing letdown energy of the purified hydrogen stream.

23 Claims, 7 Drawing Sheets

(51) Int. Cl.
    *F25J 3/04*           (2006.01)
    *C01B 3/34*          (2006.01)
    *B01D 53/047*        (2006.01)
    *C01B 3/56*          (2006.01)

(52) U.S. Cl.
    CPC .............. *F25J 1/004* (2013.01); *F25J 1/005* (2013.01); *F25J 1/0015* (2013.01); *F25J 1/0022* (2013.01); *F25J 1/0035* (2013.01); *F25J 1/0037* (2013.01); *F25J 1/0045* (2013.01); *F25J 1/0067* (2013.01); *F25J 1/0072* (2013.01); *F25J 1/0082* (2013.01); *F25J 1/023* (2013.01); *F25J 1/0221* (2013.01); *F25J 1/0225* (2013.01); *F25J 1/0227* (2013.01); *F25J 1/0229* (2013.01); *F25J 1/0232* (2013.01); *F25J 1/0234* (2013.01); *F25J 1/0236* (2013.01); *F25J 3/046* (2013.01); *F25J 3/04018* (2013.01); *F25J 3/04024* (2013.01); *F25J 3/04121* (2013.01); *F25J 3/04412* (2013.01); *F25J 3/04563* (2013.01); *F25J 3/04593* (2013.01); *B01D 2256/16* (2013.01); *C01B 2203/0233* (2013.01); *C01B 2203/0244* (2013.01); *C01B 2203/042* (2013.01); *C01B 2203/043* (2013.01); *C01B 2203/046* (2013.01); *C01B 2203/061* (2013.01); *F25J 2200/06* (2013.01); *F25J 2205/64* (2013.01); *F25J 2210/06* (2013.01); *F25J 2210/12* (2013.01); *F25J 2210/40* (2013.01); *F25J 2210/42* (2013.01); *F25J 2210/60* (2013.01); *F25J 2215/40* (2013.01); *F25J 2220/02* (2013.01); *F25J 2230/20* (2013.01); *F25J 2230/30* (2013.01); *F25J 2230/42* (2013.01); *F25J 2240/04* (2013.01); *F25J 2240/12* (2013.01); *F25J 2245/02* (2013.01); *F25J 2245/40* (2013.01); *F25J 2245/42* (2013.01); *F25J 2260/44* (2013.01); *F25J 2270/04* (2013.01); *F25J 2270/06* (2013.01); *F25J 2270/14* (2013.01); *F25J 2270/16* (2013.01)

(58) Field of Classification Search
    CPC ........ F25J 1/0082; F25J 1/0232; F25J 1/0045; F25J 1/0234; F25J 3/04121; F25J 1/0067; F25J 1/005; F25J 2210/06; F25J 2210/60; F25J 2203/61; F25J 2270/04; F25J 2245/42; F25J 2270/06; F25J 2270/16; F25J 2205/64; F25J 2240/12; F25J 2230/30
    See application file for complete search history.

(56) References Cited

U.S. PATENT DOCUMENTS

| | | | |
|---|---|---|---|
| 3,380,809 A | | 4/1968 | Newton |
| 3,446,747 A | | 5/1969 | Bongiorno |
| 3,929,438 A | | 12/1975 | Harper et al. |
| 5,231,835 A | | 8/1993 | Beddome et al. |
| 5,295,350 A | * | 3/1994 | Child .................. F01K 23/068 60/780 |
| 5,755,114 A | * | 5/1998 | Foglietta ................ F25J 1/0035 62/618 |
| 5,887,447 A | * | 3/1999 | Higginbotham ...... F25J 3/04048 62/643 |
| 6,065,306 A | * | 5/2000 | Ji ............................ C01C 1/024 62/624 |
| 6,131,407 A | | 10/2000 | Wissolik |
| 6,196,021 B1 | | 3/2001 | Wissolik |
| 6,412,302 B1 | | 7/2002 | Foglietta |
| 6,444,012 B1 | * | 9/2002 | Dolan .................. B01D 53/047 95/105 |
| 6,484,533 B1 | | 11/2002 | Allam et al. |
| 6,591,632 B1 | * | 7/2003 | Mahoney ................ F25B 9/006 62/434 |
| 6,694,774 B1 | | 2/2004 | Rashad et al. |
| 7,559,213 B2 | | 7/2009 | Allam et al. |
| 2002/0073845 A1 | * | 6/2002 | Reddy .................. B01D 53/047 95/96 |
| 2002/0121106 A1 | * | 9/2002 | Rottmann .............. F25J 3/0406 62/643 |
| 2003/0191196 A1 | | 10/2003 | Madhubhai et al. |
| 2005/0020434 A1 | | 1/2005 | Ansorge et al. |
| 2006/0260321 A1 | | 11/2006 | Minkkinen et al. |
| 2007/0193303 A1 | * | 8/2007 | Hawrysz .................. C10L 3/10 62/612 |
| 2007/0232847 A1 | * | 10/2007 | Minhas .................. C10G 31/11 585/818 |
| 2008/0087863 A1 | | 4/2008 | Fisciier et al. |
| 2009/0205367 A1 | * | 8/2009 | Price ....................... F25J 3/0223 62/612 |
| 2009/0301132 A1 | * | 12/2009 | Evans .................... F25J 1/0022 62/631 |
| 2010/0287986 A1 | * | 11/2010 | Jibb ....................... F25J 3/0409 62/640 |
| 2010/0292524 A1 | * | 11/2010 | Turner ..................... C10L 3/08 585/802 |
| 2011/0132429 A1 | * | 6/2011 | Kaufman ................ F24V 30/00 136/246 |
| 2011/0203313 A1 | * | 8/2011 | Huda ....................... C01B 3/12 62/617 |
| 2012/0060553 A1 | * | 3/2012 | Bauer ..................... F25J 1/0022 62/614 |
| 2012/0107227 A1 | | 5/2012 | Fischer et al. |
| 2012/0118011 A1 | * | 5/2012 | Terrien ................. B01D 53/002 62/619 |
| 2012/0144837 A1 | | 6/2012 | Rasmussen et al. |
| 2012/0292574 A1 | * | 11/2012 | Terrien ................. B01D 53/002 252/373 |
| 2014/0053598 A1 | * | 2/2014 | Ishimaru ................ F25J 1/0257 62/606 |
| 2014/0245780 A1 | * | 9/2014 | Wyllie .................... F25J 1/0022 62/613 |
| 2014/0283550 A1 | * | 9/2014 | Bonne .................... F25J 3/04812 62/643 |
| 2014/0352353 A1 | | 12/2014 | Wissolik |
| 2015/0233290 A1 | | 8/2015 | Lee et al. |
| 2016/0097589 A1 | * | 4/2016 | Turney ................... F25J 1/0022 62/613 |
| 2016/0216030 A1 | | 7/2016 | Truong et al. |
| 2017/0038132 A1 | * | 2/2017 | Guillard ................. G06Q 50/06 |
| 2019/0063824 A1 | * | 2/2019 | Watanabe ................ C01B 3/38 |

FOREIGN PATENT DOCUMENTS

| | | |
|---|---|---|
| JP | 2002 243360 A | 8/2002 |
| JP | 2004 210 597 | 7/2004 |
| WO | WO 00/57118 | 9/2000 |
| WO | WO 2004/065869 | 8/2004 |

OTHER PUBLICATIONS

International Search Report and Written Opinion for PCT/US2017/045524, dated Nov. 10, 2017.
International Search Report and Written Opinion for PCT/US2017/045537, dated Nov. 29, 2017.

(56) References Cited

OTHER PUBLICATIONS

International Search Report and Written Opinion for PCT/US2017/045544, dated Dec. 12, 2017.
International Search Report and Written Opinion for PCT/US2017/045549, dated Jan. 18, 2018.
International Search Report and Written Opinion for PCT/US2017/045555, dated Oct. 14, 2017.
Geijsel, J.I., et al, "Synergies Between LNG and Gas to Liquids Conversion," International Conference and Exhibition on Liquefied Natural Gas, Jan. 1, 2001.
Coulson, et al., "Carbon Capture Optionsfor LNG Liquefaction," 16th International Conference & Exhibition on Liquefied Natural Gas, pp. 1-17, Apr. 2010.
Syed, M.T., et al, "An Economic Analysis of Three Hydrogen Liquefaction Systems," Int. J. Hydrogen Energy, vol. 23, No. 7, pp. 565-576, 1998.
Bracha, M., et al, "Large-Scale Hydrogen Liquefaction in Germany," Int. J. Hydrogen Energy, vol. 19, No. 1, pp. 53-59, 1994.
Ballout, et al., "Comparison of Present Day Peakshaving Liquefaction Technologies," AICHE Spring Meeting, Natural Gas Utilization Conference, vol. 8, Apr. 2008, pp. 30-47.

* cited by examiner

INTEGRATION OF INDUSTRIAL GAS SITE WITH LIQUID HYDROGEN PRODUCTION

CROSS REFERENCE TO RELATED APPLICATIONS

This application is a non-provisional application of U.S. Provisional Applicant No. 62/371,497, filed Aug. 5, 2016, which is herein incorporated by reference in its entirety.

TECHNICAL FIELD OF THE INVENTION

The present invention relates to an apparatus and method for liquefaction of hydrogen. More specifically, embodiments of the present invention are related to liquefying a hydrogen gas stream by using a combination of refrigeration from pressure letdown of various high pressure streams.

BACKGROUND OF THE INVENTION

In a typical hydrogen liquefaction plant, high pressure hydrogen gas (e.g., 15-70 bara) is purified and dried and sent to a cold box where it is cooled to approximately −190° C. Refrigeration for this level of cooling is typically provided by a closed loop nitrogen refrigeration cycle. The nitrogen refrigeration cycle may include a single turbine, multiple turbines, tubine(s) with booster(s)in addition to mechanical refrigeration unit utilizing ammonia or other refrigerant. Additionally, the nitrogen refrigeration cycle typically employs a multistage nitrogen recycle compressor to complete the closed loop.

Alternatively, for some applications this level of refrigeration (to −190° C.) is provided by injecting a stream of liquid nitrogen (LIN) into the exchanger at approximately −190° C. This nitrogen stream vaporizes and is warmed to near ambient temperature as it exchanges cold with the hydrogen streams which are being cooled. This alternative is less thermodynamically efficient and requires liquid nitrogen to be sourced from a separate nitrogen liquefier which would still require a cycle compressor and turbine boosters.

The cooled gaseous hydrogen is further cooled and liquefied at approximately −252° C. by a second refrigeration cycle. Refrigeration for this level of cooling can be provided by a closed hydrogen (or helium) refrigeration cycle with multiple turbines and a hydrogen (or helium) recycle compressor. This hydrogen (or helium) compression is very difficult and expensive because of the low molecular weight (MW) or more specifically because these molecules are so small.

Those of ordinary skill in the art will also recognize that production of liquid hydrogen requires other steps (e.g., adsorption systems, ortho—para conversion) which are not described herein as they are not impacted by embodiments of the current invention.

U.S. Pat. No. 2,983,585 (Smith) discloses a partial oxidation process in which methane is partially oxidized with oxygen to produce carbon monoxide and hydrogen gas. The partial oxidation process is integrated with a hydrogen liquefaction process in which hydrogen gas is pre-cooled by indirect heat exchange against liquid methane and subsequently further cooled against a closed external refrigerating cycle using liquid nitrogen ("LIN") as the refrigerant. The resultant methane is compressed at the warm end of the liquefaction process and then fed to the partial oxidation process. The resultant gaseous nitrogen is compressed at the warm end of the closed cycle before being condensed by indirect heat exchange with liquid methane and recycled. It is disclosed that the liquid methane could be replaced with liquefied natural gas ("LNG"). However, with this scheme this warm end refrigeration load is simply shifted from the hydrogen liquefier unit to the natural gas liquefaction unit. An additional heat exchange system between nitrogen and LNG is required incurring additional thermodynamic losses. Also, the hydrogen stream is only cooled to approximately −150° C. due to the liquefaction temperature of LNG.

U.S. Pat. No. 3,347,055 (Blanchard et al.) discloses a process in which a gaseous hydrocarbon feedstock is reacted to produce hydrogen gas which is then liquefied in an integrated liquefaction cycle. In one embodiment, the liquefaction cycle involves two closed refrigerant cycles, the first using hydrogen gas as a refrigerant and the second using nitrogen. Compression for both refrigeration cycles takes place at the warm end of the cycles. The hydrogen to be liquefied is also cooled by indirect heat exchange against a liquefied hydrocarbon feedstock gas thereby producing gaseous feedstock at 1 atm. (e.g., about 0.1 MPa) for use in the hydrogen production plant. It is disclosed that the hydrocarbon feedstock may be natural gas. This scheme also is shifting part of the refrigeration load from the hydrogen liquefier to the natural gas liquefier.

JP-A-2002/243360 discloses a process for producing liquid hydrogen in which hydrogen that is similar to U.S. Pat. No. 3,347,055 Blanchard, feed gas is pre-cooled by indirect heat exchange against a stream of pressurized LNG. The pre-cooled hydrogen gas is fed to a liquefier where it is further cooled by indirect heat exchange against both LIN and a refrigerant selected from hydrogen or helium. The further cooled hydrogen is then expanded to produce partially condensed hydrogen which is separated into liquid hydrogen, which is removed and stored, and hydrogen vapor which is recycled in the liquefier.

Quack discloses ("Conceptual Design of a High Efficiency Large Capacity Hydrogen Liquefier"; Adv. Cryog. Eng., Proc. CEC, Madison 2001, AIP, Vol. 613, 255-263) a hydrogen liquefier cycle that, to the inventors knowledge, most accurately represents the best current technology projections for hydrogen liquefaction cycles. It should be noted that Quack uses efficiency figures for compressors and turbines that are not achievable at present but which are thought to be realistic for the future.

Current hydrogen liquefaction processes consume power at a rate of about 11 kWh/kg(liquid hydrogen) based on a gaseous hydrogen feed at a typical pressure of 2.5 MPa (25 bar). Quack ("Conceptual Design of a High Efficiency Large Capacity Hydrogen Liquefier"; Adv. Cryog. Eng., Proc. CEC, Madison 2001, AIP, Vol. 613, 255-263) suggests that the best future power consumption will be in the range 5 to 7 kWh/kg(liquid hydrogen) if his suggested improvements are utilized.

This scheme involves pre-cooling the hydrogen to about −53° C. by indirect heat exchange with propane, ammonia, fluorocarbons or other refrigerants. The hydrogen is then further cooled and liquefied in two or more steps by indirect heat exchange against a mixture of helium and neon. The use of neon increases the molecular weight of the refrigerant mixture making it easier for the recycle compressor and thereby reducing compression energy (generally 75% He of MW=4 and 25% Ne of MW=20 having a mixture of MW=8). However, the use of neon in the mixture also prevents the temperature level of the refrigerant from achieving the very cold temperatures (−252° C.) required for the liquefaction of hydrogen. In addition, helium and neon must be sourced and its composition in the neon/helium mixture carefully managed. Also, unlike the present invention, this refrigerant must be compressed specifically and solely for the purpose of the hydrogen liquefaction energy.

It is a object of the present invention to develop a scheme which does not require neon or helium and which can efficiently provide refrigeration at the very cold end of the hydrogen liquefier (−252° C.).

The low molecular weight of hydrogen means that a very large number of stages of compression must be used, and if centrifugal compressors are specified and, likewise for a given expansion duty, a large number of centrifugal expansion stages will be required operating in series. In current plants, the hydrogen compressors are often reciprocating units. Multiple stage compressors plus large recuperative heat exchangers will usually be used in the pre-cooling steps of the process to remove the heat of compression.

The typical processes described above will typically utilize three hydrogen compressors and two nitrogen compressors ($H_2$ Inlet Feed Compressor, $H_2$ Cycle Feed Compressor, $H_2$ Recycle Compressor, $N_2$ Feed Compressor and $N_2$ Recycle Compressor). As such, these types of systems and methods require significant capital and operational costs (e.g., both utilities and maintenance) in order to achieve the compression needed for the nitrogen and hydrogen refrigeration cycles.

Moreover, due to its low molecular weight and small molecular size, hydrogen is very difficult and therefore expensive to compress. Therefore, it is desired to produce liquid hydrogen without hydrogen compression or with reduced hydrogen compression lowering or reducing the associated large capital expenditures or large amounts of operational costs.

SUMMARY OF THE INVENTION

The present invention is directed to a process that satisfies at least one of these needs. In certain embodiments of the invention, a method is provided for liquefying a pressurized hydrogen gas by using the letdown energy previously being wasted. In certain embodiments, the letdown energy can be provided by letdown of a high pressure gas selected from the group consisting of (1) a natural gas stream from a high pressure natural gas pipeline, (2) a nitrogen gas stream from a high pressure nitrogen pipeline, (3) a hydrogen gas stream from a nearby facility, and combinations thereof.

In an optional embodiment, the high pressure gas can further include a dry and purified air gas from or derived from an air separation facility, wherein the dried and purified air gas is selected from the group consisting of pressurized air from a main air compressor, pressurized air from a booster air compressor, pressurized nitrogen from a medium pressure column or nitrogen compressor, and combinations thereof.

In one embodiment, the method for liquefying a pressurized hydrogen gas originating from a pressure swing adsorber unit can include the steps of: withdrawing a hydrogen containing gas, which is preferably a hydrogen containing purge gas, from a methanol production unit; introducing the hydrogen containing gas to a pressure swing adsorber (PSA) unit under conditions effective for purifying the hydrogen containing gas to produce a purified hydrogen stream; sending the purified hydrogen gas to a hydrogen liquefaction unit under conditions effective for the liquefaction of hydrogen thereby producing a liquefied hydrogen stream, wherein the hydrogen liquefaction unit is configured to provide a first refrigeration source and a second refrigeration source, wherein the first refrigeration source provides refrigeration using expansion of a high pressure nitrogen stream, which is preferably from a nitrogen pipeline, wherein the second refrigeration source provides refrigeration using expansion of a high pressure hydrogen gas stream to produce a warm hydrogen gas stream, wherein the high pressure hydrogen gas stream is derived from a hydrogen stream selected from the group consisting of the purified hydrogen stream, a second purified hydrogen stream withdrawn from a second PSA unit, and combinations thereof.

In optional embodiments of the invention:
the PSA unit is part of a methanol facility;
the high pressure nitrogen is expanded in one or more turboexpanders;
the one or more turboexpanders are arranged in series with each other;
the one or more turboexpanders are arranged in parallel with each other;
the high pressure nitrogen is expanded to a pressure of at least 4 bara and utilized as a utility gas;
the warm hydrogen gas stream is used as a fuel gas in a unit selected from the group consisting of a steam methane reformer (SMR), a steam boiler, a fired heater, and combinations thereof, wherein it is preferable that the SMR is upstream of the PSA;
the second refrigeration source comprises: expanding a first portion of the high pressure hydrogen gas stream in a first expansion turbine to a first pressure; and expanding a second portion of the high pressure hydrogen gas stream in a second expansion turbine to a second pressure, wherein the first pressure is higher than the second pressure;
the first refrigeration source provides warm temperature cooling and the second refrigeration source provides cold temperature cooling;
a third source of refrigeration is provided using natural gas letdown energy;
the third refrigeration source provides warm temperature cooling;
a fourth source of refrigeration is provided using letdown energy of an air gas originating from an air separation unit (ASU);
the air gas originating from an ASU is a gas stream selected from the group consisting of compressed and purified air from a booster air compressor, a nitrogen stream, which can be from a nitrogen pipeline, and combinations thereof;
the PSA unit and the second PSA unit share a common feedstream;
the method can include the absence of a step of compressing the purified hydrogen stream or the expanded purified hydrogen stream using compression means powered by a motor downstream of the PSA unit and the hydrogen liquefaction unit, wherein such compressed hydrogen would provide the cold temperature refrigeration; and/or
the purified hydrogen stream is at a pressure of at least 15 bar.

In one embodiment, the method for producing liquid hydrogen can include the steps of: introducing pressurized natural gas from a high pressure natural gas pipeline to a gas processing unit under conditions effective for producing a purified hydrogen stream; and introducing the purified hydrogen stream to a hydrogen liquefaction unit under conditions effective to produce a liquid hydrogen stream, wherein the hydrogen liquefaction unit provides a warm temperature cooling and a cold temperature cooling to the purified hydrogen stream, wherein the warm temperature cooling is provided by utilizing letdown energy of a pressurized stream selected from the group consisting of a nitrogen stream sourced from a nitrogen pipeline, liquid nitrogen, a natural gas stream sourced from the high pressure natural gas pipeline, an air gas sourced from an air separation unit, and combinations thereof, wherein the cold temperature refrigeration is provided by utilizing letdown energy of the purified hydrogen stream.

In optional embodiments of the method:
the method can also include the absence of a step of compressing the purified hydrogen stream or the expanded purified hydrogen stream using compression means powered by a motor downstream the gas processing unit and the hydrogen liquefaction unit, wherein such compressed hydrogen would provide the cold temperature refrigeration;
the gas processing unit comprises methanol production plant;
the gas processing unit comprises a methanol to propylene production plant;
the gas processing unit comprises an ammonia production plant;
argon and/or nitrogen are removed from the purified hydrogen stream being liquefied and the hydrogen stream providing letdown energy for refrigeration in a common adsorber unit;
the cold temperature refrigeration is provided by at least two turbines operating in a series arrangement;
one or more of the hydrogen turbines are configured to drive one or more boosters, wherein the one or more boosters are used to pressurize the purified hydrogen stream, the expanded pressurized hydrogen stream or combination thereof;
the cold refrigeration provided by the letdown of hydrogen is provided by three turbines, wherein, hydrogen is expanded in a first turbine producing a first expanded hydrogen stream, a first portion of the first expanded hydrogen stream is further expanded in a second turbine producing a second expanded hydrogen stream, a second portion of the first expanded hydrogen stream is cooled and expanded in a third turbine producing a third expanded hydrogen stream, wherein the second and third expanded hydrogen streams are warmed by heat exchange with the hydrogen stream being cooled;
the second and third expanded hydrogen streams are combined before or during the warming step; and/or
the hydrogen to the first turbine is partially cooled by refrigeration only from hydrogen streams before the first hydrogen turbine, wherein the hydrogen streams providing the cooling consist of the first, second, and third expanded hydrogen streams, a fourth expanded hydrogen stream, storage tank boil off and combination thereof.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In their most simple forms, embodiments of the present invention include integration of a gas processing unit with a hydrogen liquefaction unit, wherein the gas processing unit provides a portion of the refrigeration using available letdown energy that would otherwise be wasted in order to liquefy the hydrogen.

In certain embodiments, the gas processing unit may contain a methanol (MeOH) plant and in some cases a methanol to propylene plant. In another embodiment, pressurized air and/or nitrogen from an air separation unit may also be used to provide letdown energy for the hydrogen liquefier. In certain embodiments, it is proposed to integrate the underutilized letdown energy of the gas processing unit into the liquefaction unit to produce a liquid at a reduced operating cost.

In certain embodiments, gas processing units contain one or more high pressure supply gas streams that provide gas to a medium pressure consumer. Some systems also have underutilized compression capacity, which can be utilized such that the gas can be letdown to atmospheric pressure and vented or recycled. The energy extracted from the pressure letdown streams may be used to provide refrigeration for a counter current heat exchange with the hydrogen gas to be cooled and liquefied.

In typical operations of many gas processing units, it is common to letdown higher pressure gas streams without recovery of any of the resulting refrigeration produced during expansion of the gases.

For example, a methanol plant requires large quantities of natural gas feed from a high pressure transmission network. A portion of this natural gas feed is reduced in pressure through a control valve to low pressure and burned as fuel in one or more of the following: the steam methane reformer (SMR), fired heater, gas turbine, auxiliary boiler, steam boiler, and auxiliary burners.

The remaining portion (and majority) of the natural gas feed is processed in a desulfurization unit, and reacted in the SMR and/or the autothermal reformer (ATR) to produce a syngas. In a methanol plant, the syngas (which contains carbon dioxide, carbon monoxide, methane, and hydrogen and has a combined molecular weight of about 11) is further compressed to approximately 50-150 bara and reacted to produce methanol and a pressurized byproduct stream that is hydrogen rich. This byproduct stream can be split into two fractions, with the first fraction going to a pressure swing adsorber (PSA) to produce a purified hydrogen product, and the remaining second fraction, referred to as a purge gas, is typically reduced in pressure with a control valve to approximately 0.3-7 bara and used as fuel within the methanol plant.

This compression energy is required for the production of methanol, but can be utilized in certain embodiments of the present invention without any additional energy input for the very cold refrigeration level of a hydrogen liquefier by utilizing the letdown energy of the purge gas. Unlike the prior art where the refrigeration compression energy must be specifically and solely allocated to the liquefaction of hydrogen, embodiments of the present invention can reduce or even eliminate the need to compress the hydrogen stream to be liquefied by using the pressurized hydrogen coming from the methanol plant. In addition, the molecular weight of the compressed stream of certain embodiments of the present invention (MW=11) is higher than both Quack's state of the art liquefier of 8 and the classical liquefiers of 2 for hydrogen or 4 for helium.

In another embodiment, the gas processing unit can include utility nitrogen users. These users use large quantities of nitrogen at pressures of approximately 4-8 bara as a utility gas. This is typically supplied by pressure letdown from a nearby high pressure (~37 bara) nitrogen pipeline. In one embodiment, the gas processing unit can include a methanol to propylene (MMTP) facility, which also requires large quantities of gaseous nitrogen as a utility gas at a pressure of approximately 4-8 bara.

Therefore, in certain embodiments, there can be at least three streams having underutilized pressure letdown energy: high pressure nitrogen letdown for utility gas, high pressure natural gas letdown for use as fuel or to low pressure distribution network, and hydrogen rich purge as letdown as fuel, which typically do not utilize the high pressure energy available of the pressure control valves. Additionally, the methanol process also produces a high pressure hydrogen product stream. This equipment (such as a PSA), can be designed for increased flow and used for refrigeration expansion purposes.

In certain embodiments, the potential high pressure energy of these streams may be utilized by expansion of the streams in conjunction with expansion of a pressurized nitrogen gas stream from a high pressure nitrogen pipeline to lower pressure or vent.

An additional source of refrigeration can be provided by expansion of a pressurized gas stream originating from an ASU such as air from the discharge of the booster air compressor (BAC), pressurized nitrogen from a pipeline or a nitrogen compressor, and combinations thereof. For purposes herein, nitrogen sourced from a pipeline is considered to be a pressurized gas stream originating from an ASU.

In normal operation of an ASU, it is typical for the BAC to operate below its maximum design condition. This is because the maximum design conditions are often based on worst case conditions (e.g., maximum liquid products, maximum high pressure gaseous oxygen, summer conditions, etc . . . ), which may be occasionally required but are rarely an actual operating point. Additionally, the design capacities of the major equipment such as MAC and BAC can be maximized to the limit of a step change in capital cost, for example based on the limit of a compressor frame size. Therefore, in a typical air separation unit, there is often excess capacity available from the BAC, the MAC, and pretreatment such that high pressure air can be withdrawn from the ASU at approximately 15-100 bara with little or zero additional capital cost and only a small incremental increase in operational costs. With integration of the methanol plant, additional savings can be achieved by driving the MAC and BAC using steam turbines using available steam from the methanol plant.

In another embodiment, a portion of the high pressure air that is not sent to the ASU cold box can be mixed with available high pressure nitrogen (HPN$_2$) from a nitrogen pipeline at approximately 30-70 bara. This can result in a low-cost, lean synthetic high pressure air (or impure N$_2$) stream at approximately 30-70 bara to be available for expansion refrigeration in the liquefier. In one embodiment, the air injection may be limited by the combustibility limit of O$_2$ in methane (approx 12%) or O$_2$ in H$_2$ (approx 6%) or by design margin to these limits due to potential leakage.

Therefore, certain embodiments of the invention provide for an improved process for liquefaction of hydrogen that incorporates the available wasted energy of these aforementioned processes in an efficient manner. In another embodiment, the process can also include liquefaction of natural gas and/or liquefaction of nitrogen.

Figure 1:
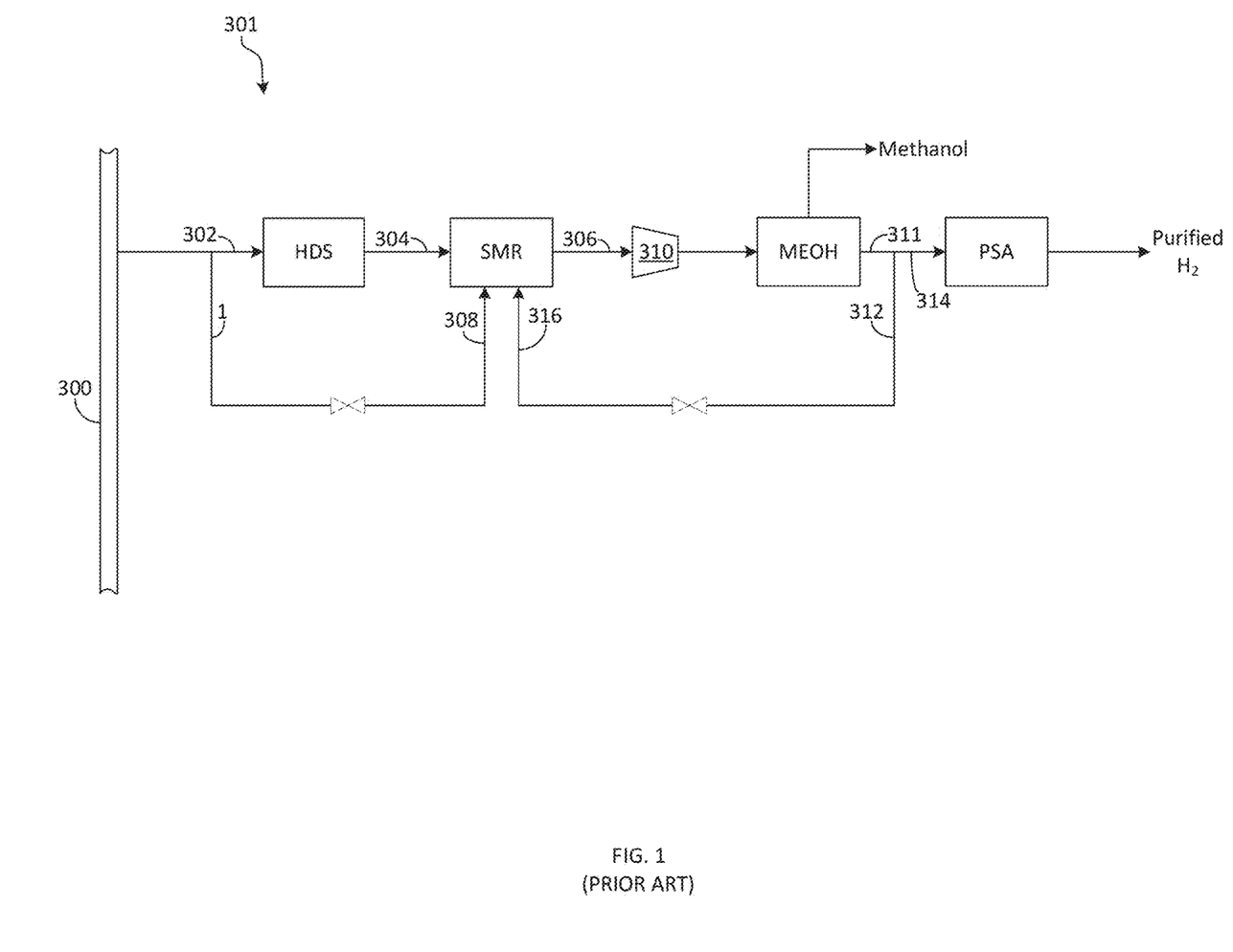
FIG. 1 shows an embodiment of a methanol production facility in accordance with an embodiment of the prior art.

FIG. 1 provides a schematic overview of a typical methanol plant 301. Natural gas is withdrawn from natural gas pipeline 300, with a first portion of the natural gas 302 being sent to a hydro-desulfurization unit to remove sulfur to form a desulfurized natural gas 304. This stream is then sent to a steam methane reformer (SMR) in order to produce syngas 306, which is then pressurized to approximately 50-70 bara in compressor 310 before being sent to the methanol production facility under conditions effective for producing methanol and a purge gas 311. A first portion of the purge gas 314 is then sent to a pressure swing adsorber (PSA) in order to recover purified hydrogen. In a typical methanol plant, second portion of the purge gas 312, which is at an increased pressure (~50-70 bara) of only nominally less than that of the discharge pressure of compressor 310, is typically expanded across a valve to very low pressure (e.g., about atmospheric pressure) and then sent to the SMR for use as purge gas fuel 316. Similarly, it is typical to supplement this fuel by use of a second portion of the natural gas 1 for use as fuel to the SMR after expansion in a valve via line 308.

Figure 2:
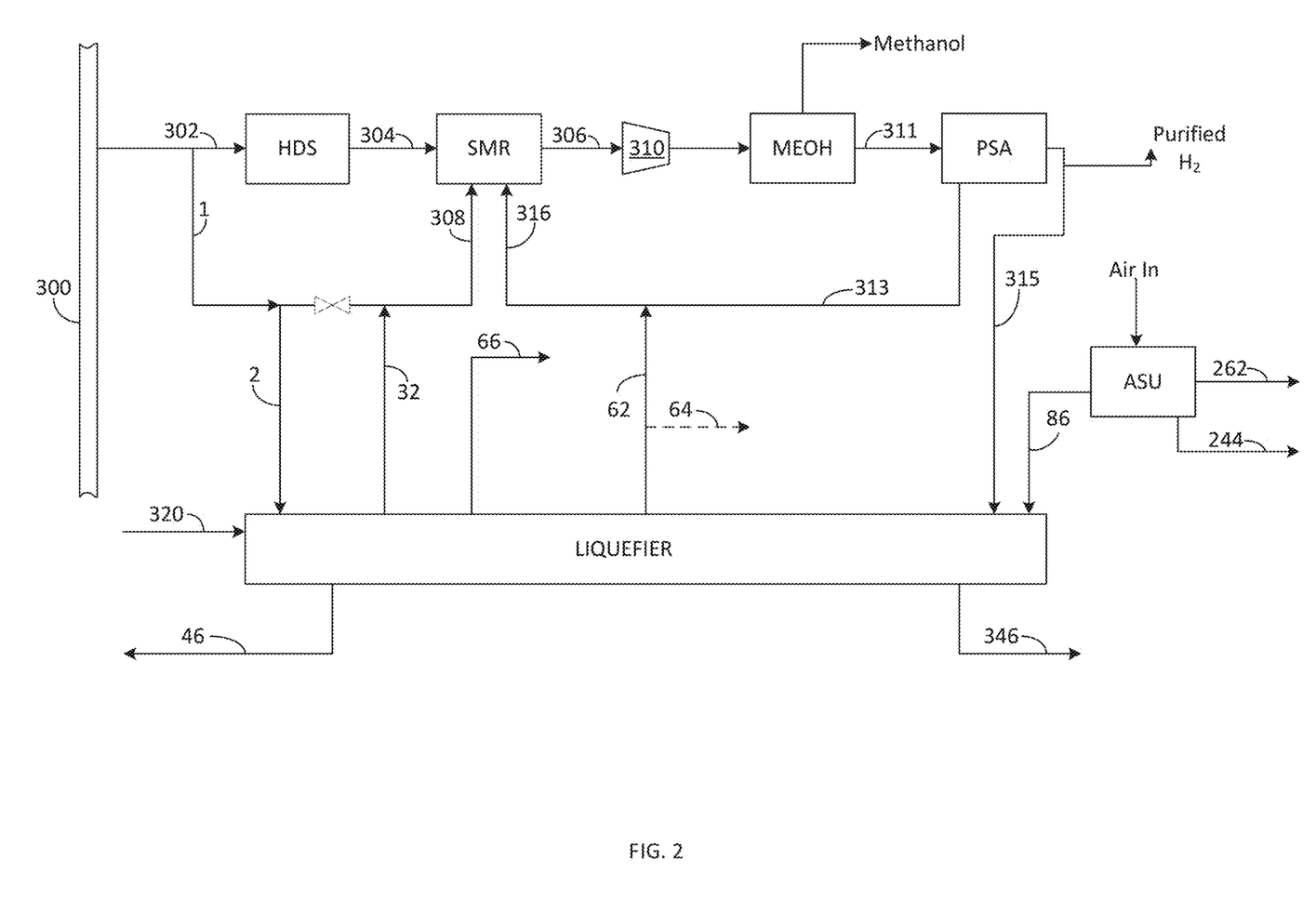
FIG. 2 shows an embodiment of an integrated methanol production facility with an ASU and liquefier in accordance with an embodiment of the present invention.

FIG. 2 provides a schematic overview of an integrated methanol plant, liquefier and ASU in accordance with an embodiment of the present invention. In one optional embodiment of the present invention, instead of wasting the expansion energy of natural gas 1 by expansion across a valve, natural gas 2 can be sent to the liquefier, as described in FIG. 6, in order to provide a portion of the refrigeration used to cool and liquefy the natural gas.

Additionally, instead of expanding and sending second portion of purge gas 312 to the SMR as fuel 316, additional purge gas 311 is sent to the PSA in order to produce additional high pressure purified hydrogen. Therefore, in certain embodiments of the present invention, the PSA used to purify the purge gas 311 is preferably larger than normal in order to accommodate the increased volumetric flow of purge gas 311 to the PSA. In another embodiment the impurities 313, which are adsorbed during the adsorption phase of the PSA and desorbed during the regeneration phase of the PSA, can be sent from the PSA to the SMR. In operation, these desorbed impurities from the PSA are at low pressure and compensate for not sending the purge gas to the SMR as fuel. The net fuel balance is only impacted by the small reduction of hydrogen molecules removed as liquid product 346 which is compensated by a small increase in the natural gas fuel stream 1.

As noted, in certain embodiments of the present invention, the volumetric flow rate of the purified hydrogen can be increased as compared to normal operation. This allows for sending a first portion of the purified hydrogen 315 to the liquefier, which will be discussed in more detail in FIGS. 3-5. As this purified hydrogen stream is already at an elevated pressure (e.g., typically more than 50 bara), certain embodiments of the invention do not require use of a hydrogen feed compressor or refrigeration cycle compressor for the very low temperature level of the cycle.

Figure 3:
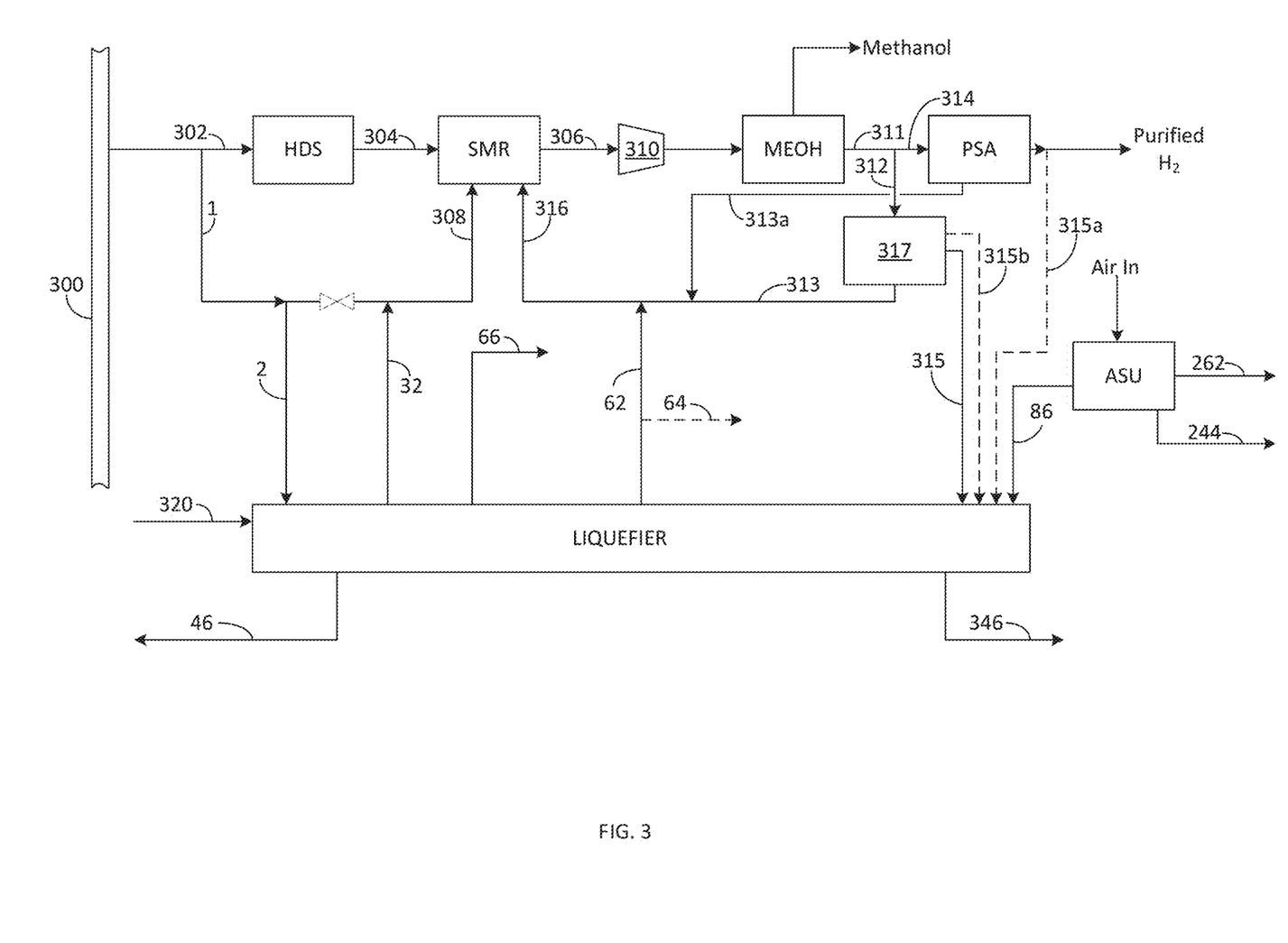
FIG. 3 shows another embodiment of an integrated methanol production facility with an ASU and liquefier in accordance with an embodiment of the present invention.
Figure 4:
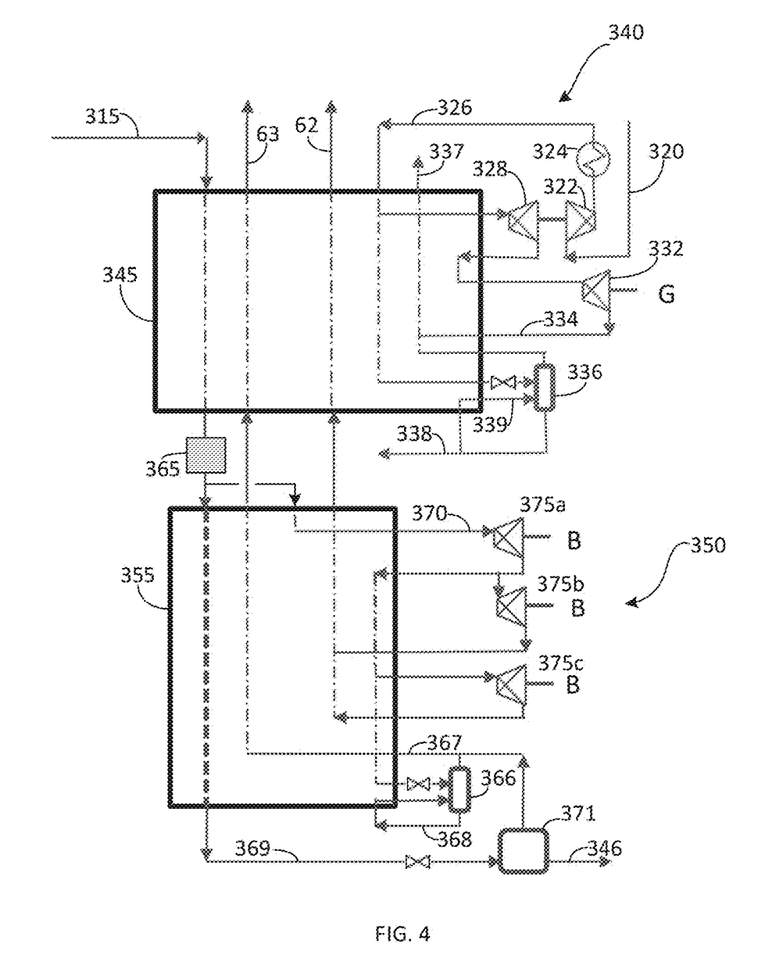
FIG. 4 shows an embodiment of a hydrogen liquefier in accordance with an embodiment of the present invention.
Figure 5:
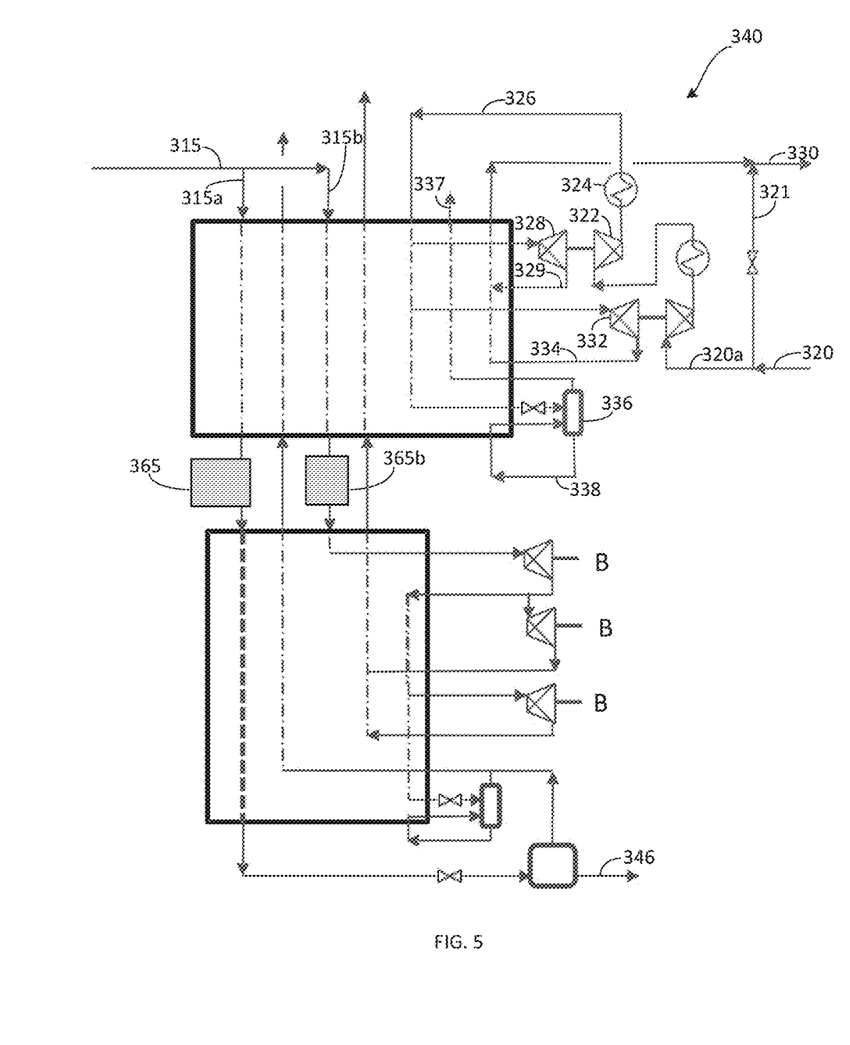
FIG. 5 shows another embodiment of a hydrogen liquefier in accordance with an embodiment of the present invention.

The other source of refrigeration energy can be provided by letting down high pressure nitrogen 320 coming from a nitrogen pipeline. Details of the refrigeration cycle are shown in FIGS. 3-5. The hydrogen liquefier is operated under conditions effective for producing liquid hydrogen product 346 and low pressure hydrogen 62, 64. In certain embodiments, liquefier can also produce LNG (or liquid nitrogen) 46, and medium pressure nitrogen 66, which can be used for as a utility gas in a nearby facility, for example the methanol plant 301.

While FIG. 2 does not show second portion of the purge gas 312, certain embodiments of the invention can include using second portion of the purge gas 312 as a potential source for letdown refrigeration energy. Second portion of the purge gas, which is a high pressure hydrogen rich stream received from the methanol plant, can be partially cooled (e.g., the purge gas is removed from an intermediate section of the heat exchanger), expanded in a turbine (or set of turbines arranged in series or parallel), which can be linked to a generator or booster or other system for dissipation to atmosphere, to form an expanded purge gas before being warmed in the main exchanger of the liquefier, and sent back to the methanol plant as low pressure fuel (for example mixed with 316 of FIG. 2). The expanded purge gas can therefore provide an additional source of the warm end refrigeration used to cool and eventually liquefy the hydrogen. This reduces the size of the PSA and therefore the hydrogen available for letdown to provide cold end refrigeration, but provides increased warm end refrigeration as limited by the freezing points of components in the purge gas.

In another embodiment not shown, after the expanded hydrogen rich purge gas is re-warmed it may be boosted (in a booster which is driven by the expander), re-cooled in the main exchanger, expanded again in a second set of turbines and re-warmed in the main exchanger. This arrangement provides increased warm end refrigeration production by utilizing the higher pressure ratios of the purge gas letdown while at least partially offset by additional cycle complexity and capital cost. This is of particular interest for this application because the hydrogen expansion ratio is higher than a typical hydrogen liquefier because it is from the high pressure of PSA outlet to very low pressure of fuel inlet. A typical hydrogen liquefier has lower pressure ratio because they must try to minimize the number of compression stages of the cycle compressor.

Integration of the methanol plant, liquefier, and optional ASU provides significant energy savings compared to a stand-alone hydrogen liquefier. In one embodiment, all of the refrigeration used for liquefaction of the hydrogen gas stream is provided by the cooling energy provided from the expansion of nitrogen from a nitrogen pipeline and expansion of at least a portion of the purified hydrogen product stream from the PSA. In additional embodiments, additional sources of refrigeration can include expansion energy provided by pressurized natural gas from a natural gas pipeline and air gas from the ASU. Alternatively, for increased liquefaction, this liquefaction energy can be supplemented by one or more additional liquefaction energy sources such as a cycle compressor driven by electric, gas turbine, or steam turbine drive or liquid nitrogen injection.

FIG. 3 provides an alternate embodiment to the integrated methanol plant, liquefier and ASU shown in FIG. 2. In FIG. 2, all of the purge gas 311 from the methanol unit MEOH was sent to the PSA for purification. However, in the embodiment of FIG. 3, like the embodiment shown in FIG. 1, a portion of the purge gas 312 is withdrawn. However, instead of sending it to the SMR for use as fuel, the stream is sent to a second PSA 317 for treatment in order to produce high pressure hydrogen rich gas 315. Low pressure impurities 313, 313a are again sent to the SMR after combining with low pressure hydrogen 62 for use as fuel. The embodiment shown in FIG. 3 is particularly advantageous for situations in which there is already an existing methanol facility, and the hydrogen liquefier is built as an add-on. Since second PSA 317 is added, the original PSA does not need to be replaced with a larger unit. This allows for an easier and more economical way of upgrading an existing site with minimal downtime.

In other embodiments, streams 315a, 315b can both be very high purity hydrogen such that both can be brought to the cold end temperatures (~−250° C.) without freezing trace components. Alternatively, one of the PSAs can be designed with higher quantities of trace components (e.g., for purpose of reduced PSA cost and/or higher hydrogen recoveries from the PSA) and used for slightly warmer refrigeration temperature level (for example −200° C. to −240° C.). The other PSA would preferably operate at very high purity hydrogen to provide the liquid hydrogen product and very cold end (−230° C. to −252° C.) refrigeration. Similarly, the PSAs can be operated at different pressures for purposes of optimizing PSA costs, hydrogen recovery, and liquefier refrigeration.

FIG. 4 provides a schematic representation of an embodiment utilizing high pressure energy of (1) high pressure nitrogen gas 320 from a pipeline that is being letdown to low pressure vent and (2) high pressure hydrogen rich gas 315 letdown for use as fuel or low pressure gaseous products 62 and 63 and liquid hydrogen product 346.

Nitrogen refrigeration cycle 340 provides the warm temperature cooling, while hydrogen expansion 350 provides the cold temperature cooling. In nitrogen refrigeration cycle 340, high pressure nitrogen 320, which is preferably sourced from a nitrogen pipeline operating at more than 30 bara, can be further compressed in nitrogen booster 322 and cooled in aftercooler 324 to form boosted nitrogen 326. A first portion of this boosted nitrogen can then be slightly cooled in first heat exchanger 345 before being expanded in nitrogen turbine 328, cooled (or warmed depending on specific nitrogen conditions such as nitrogen supply pressure) again in first heat exchanger 345, expanded again in second nitrogen turbine 332 to about atmospheric pressure to form fully expanded nitrogen 334, which is then re-warmed and vented to the atmosphere, or optionally used for cooling in an evaporative cooling tower. Nitrogen turbine 328 provides power used by nitrogen booster 322. In the embodiment shown, second nitrogen turbine 332 is connected with a generator G thereby producing electricity, which can be sold back to the grid. Those of ordinary skill in the art will also recognize that second nitrogen turbine 332 can be connected with a second nitrogen booster (see FIG. 5) depending on the operating conditions (e.g., flow rates, pressures, expansion ratios, thermodynamics, etc.) of the system.

In the embodiment shown, a second portion of the boosted nitrogen is at least partially condensed within the first heat exchanger 345 and withdrawn at a colder location than the first portion, before being pressure reduced across a valve to atmospheric pressure and introduced to liquid/gas separator 336. The gaseous portion 337 is re-warmed in first heat exchanger 345 and eventually vented to the atmosphere. Liquid nitrogen (LIN) 338, is withdrawn from the bottom of liquid/gas separator 336, with a portion 339 being warmed and partially vaporized before being then recycled back to the liquid/gas separator 336. Portion 339 acts as a thermosiphon. In another embodiment, this heat transfer may be without the thermosiphon.

First portion of the purified hydrogen 315 can be expanded in valve (not shown) before being cooled in first heat exchanger 345, preferably to a temperature sufficient to remove impurities by adsorption, wherein said impurities can include argon, nitrogen, etc. These impurities are then removed in hydrogen purification unit 365 so that they do not freeze during cold temperature cooling within second heat exchanger 355. Because the hydrogen refrigeration is an open cycle, it is preferable for the stream being liquefied and the stream being expanded for cold refrigeration to both have impurities removed in a cold adsorber. This can be a common cold adsorber as shown in FIG. 4. For the typical closed hydrogen (or He) refrigeration cycle, only the makeup to the loop and the stream being liquefied must have this adsorption step.

In the embodiment shown, the purified hydrogen is split into two portions, with one portion 369 being liquefied in second heat exchanger 355, while the other portion is used to provide the cold temperature cooling via hydrogen expansion 350. The liquefied portion 369 can then be expanded in a valve and introduced to separator 371. Vapor from separator 371 is returned to exchanger 355 for cold end refrigeration and liquid hydrogen 346 is withdrawn as product.

In the embodiment shown, the other portion of the purified hydrogen 370 can be slightly cooled in second heat exchanger 355 before undergoing a series of expansion steps in hydrogen turbines 375a, 375b, 375c to produce a cold medium pressure hydrogen stream that is then re-warmed in second heat exchanger 355 and first heat exchanger 345 to form warm medium pressure hydrogen 62, which can be sent back to the SMR for use as fuel, or used for some other purpose (see 64 in FIGS. 2 and 3).

As with the nitrogen refrigeration cycle 340, a second fraction of the hydrogen is at least partially condensed within the second heat exchanger 355 and withdrawn at a colder location than the rest of the hydrogen 370, before being pressure reduced across a valve to about atmospheric pressure and introduced to liquid/gas separator 366. The gaseous portion 367 is re-warmed in second heat exchanger 355 and first heat exchanger 345 to form low pressure hydrogen. Liquid hydrogen 368, is withdrawn from the bottom of liquid/gas separator 366, and then recycled back to the liquid/gas separator 366, again acting as a thermosiphon. Alternatively, this heat transfer may be without thermosiphon.

In the embodiment shown, by providing approximately 57 mtd of 65 bara hydrogen (stream 315) and about 390 mtd nitrogen at 36 bara (stream 320), the method can provide approximately 11 mtd liquid hydrogen (stream 346), 42 mtd medium pressure hydrogen (stream 62), 4 mtd low pressure hydrogen (stream 63), while also producing around 160 kW of energy from second nitrogen turbine 332.

FIG. 5 provides a schematic representation of a second embodiment utilizing high pressure energy of (1) high pressure nitrogen gas 320a from a pipeline that is being letdown to low pressure vent and (2) high pressure hydrogen rich gas 315 letdown for use as fuel or low pressure product. In this embodiment, instead of expanding all of the nitrogen to atmospheric pressure using first and second expanders 328, 332 connected in series, a portion of the nitrogen 329, 334 is expanded to a medium pressure in the first and second expanders 328, 332 connected in parallel. This is particularly advantageous if there is a nearby user of nitrogen utility gas, since that user likely would have just flashed the high pressure nitrogen gas from the pipeline to medium pressure without capturing any of the refrigeration energy potential of the gas stream. Depending on the flow of medium pressure nitrogen 330 needed, if portions of nitrogen 329, 334 are not enough, additional nitrogen can be provided via by-pass line 321.

Additionally, this embodiment shows an example of splitting the initial high pressure hydrogen 315 into two streams 315a, 315b upstream of the first heat exchanger 345. In doing this, an additional purification unit 365b is also employed. In the embodiment shown, hydrogen stream 315a gets liquefied and hydrogen stream 315b provides the cold temperature cooling. Splitting the cold adsorber into 365 and 365b as shown in FIG. 5 allows each to operate at different pressures, which in some cases can provide more optimized heat transfer and cold adsorber costs. For example, 365 could be operated at approximately 15-25 bar while 365b operated at the higher 50-70 bar.

In the embodiment shown, by providing approximately 57 mtd of 65 bara hydrogen (stream 315) and about 626 mtd nitrogen at 37.5 bara (stream 320a), the method can provide approximately 11 mtd liquid hydrogen (stream 346), 42 mtd medium pressure hydrogen (stream 62), 4 mtd low pressure hydrogen (stream 63), and 543 mtd of medium pressure nitrogen (streams 329 and 334) at 8.5 bara.

In the embodiment shown in FIG. 4, the process uses available capacity of any upstream underutilized nitrogen compression equipment upstream of the nitrogen pipeline. This nitrogen pipeline compression equipment may be underutilized since typical design requires capacity for worst operating conditions (e.g., summer, end of catalyst life, maximum consumer operating conditions), which occurs infrequently. In one embodiment, the hydrogen liquefier can be configured to operate periodically (i.e., not continuous), such that in certain embodiments, the hydrogen liquefier is proposed to only operate at times when the extra nitrogen compression capacity is available. In certain embodiments, the result is the nitrogen recycle compressor that is typically used can be removed yielding reduced opex (operating expense) and significantly reduced capex (capital expense) for the liquefier. This is in addition to the capex plus opex savings due to integration with the hydrogen letdown.

FIG. 5 differs from FIG. 4 in that the embodiment of FIG. 5 expands at least a portion of the high pressure nitrogen gas to a medium pressure for use as a utility gas. Additionally, the embodiment shown in FIG. 5 does not require underutilized nitrogen compression equipment capacity, but rather incorporates a consumer for medium pressure nitrogen. This is particularly useful if a nearby industrial site (e.g., MeOH plant) requires large quantities of medium pressure nitrogen as a utility gas. In this case, the nitrogen that would have been letdown to a medium pressure consumer by wasting the energy through a valve is now letdown with expansion turbines to recover the energy yielding near "zero energy" opex and significantly reduced capex for the liquefier.

At least a portion of these high pressure nitrogen and hydrogen streams are diverted to an exchanger where they are cooled down, then expanded in their respective turbines to extract energy and produce colder process streams, which are then re-warmed in the exchanger to cool the turbine inlet streams as well as the fluid to be liquefied (e.g., hydrogen). Other arrangements of turbine booster are possible.

The cold adsorbers 365, 365b are used to remove nitrogen and argon from the hydrogen streams 115a, 115b entering the very cold section 355 of the process where these components would freeze and damage equipment. A single large cold adsorber system can be used by combining the hydrogen stream being expanded with the hydrogen stream to be liquefied as product, cooling in the warm section, purifying and then splitting the stream to be liquefied from the stream to be expanded (FIG. 4). Alternatively, separate cold adsorber units can be used for the stream to be liquefied and the stream to be expanded (FIGS. 4 and 5). Alternatively, the nitrogen and argon can be removed in a purification system on the combined warm end such that the cold adsorbers can be removed. The location of this adsorption step is independent and not impacted by the nitrogen refrigeration cycle differences between FIGS. 3 and 4.

While the size of the PSA for certain embodiments of the present invention, as compared to a PSA of the prior art, can be significantly increased (or an additional PSA is added) in order to generate the hydrogen for expansion in the liquefier, this cost is offset by the removal of the hydrogen cycle compressor and energy savings.

In one embodiment, only the hydrogen letdown is used for providing the secondary cooling (e.g., temperatures below −190° C.), such that the hydrogen recycle compression is removed. In one embodiment, the warmed medium pressure hydrogen leaving the liquefaction unit can be either used as medium pressure hydrogen product or sent back to the industrial site (MeOH plant), wherein it is mixed with the PSA off-gas and consumed as fuel. This refrigeration provided for the cold end of the hydrogen liquefier is independent from the various options for the nitrogen cycle of the warm (e.g., >−190° C.) section. The result is at least partially reduced opex and reduced capex.

Figure 6:
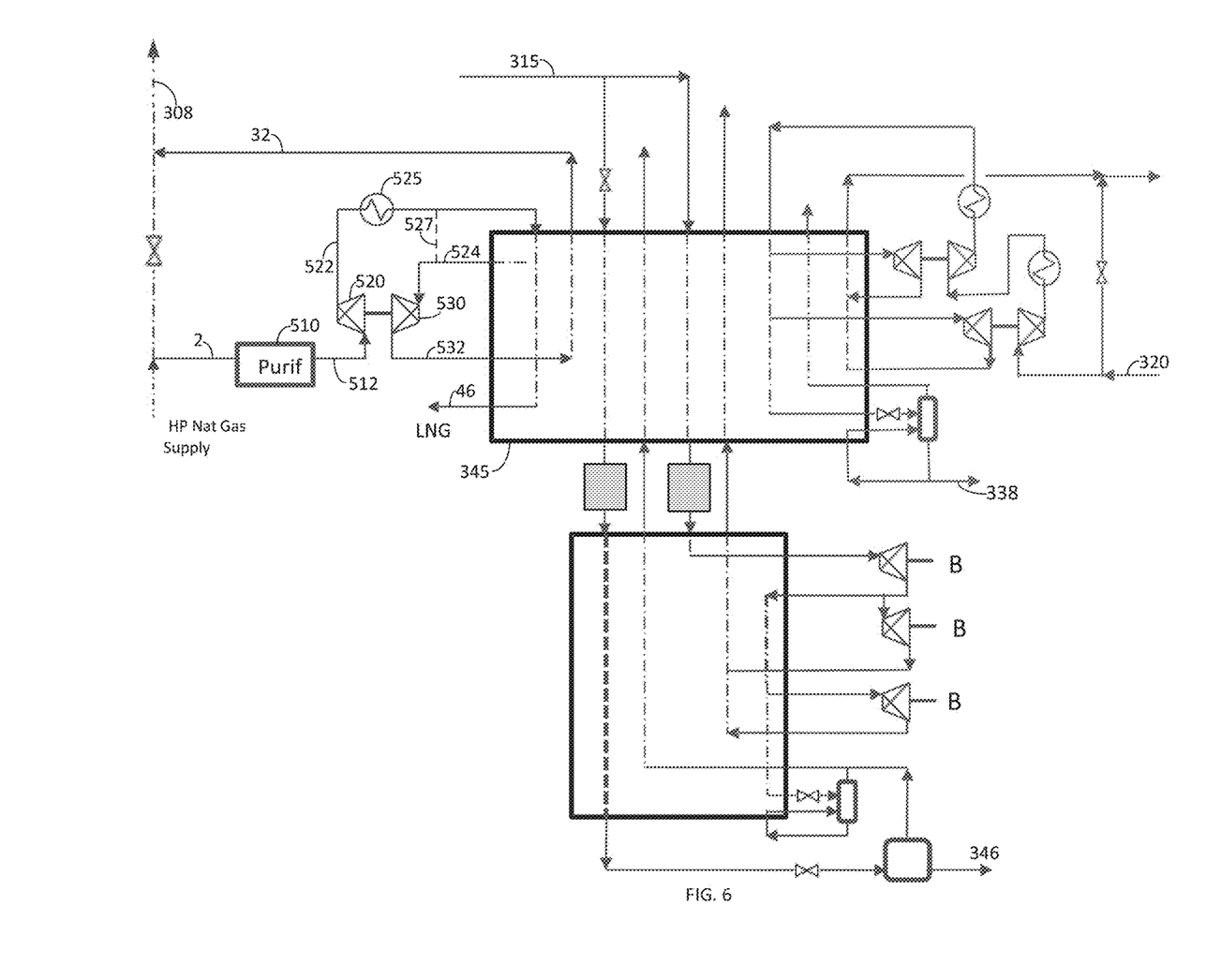
FIG. 6 shows another embodiment of a hydrogen liquefier in accordance with an embodiment of the present invention FIG. 7 provides a schematic diagram of an air separation unit in accordance with an embodiment of the present invention.

FIG. 6 presents a schematic diagram of an embodiment in which the letdown energy of a natural gas stream is used to produce both LNG and additional liquefied nitrogen (LIN). This embodiment can be particularly useful with an integrated methanol plant, since methanol plants require large flow rates of natural gas that are supplied from the high pressure natural gas pipeline (30 to 60 bara) and letdown to medium pressure (2-5 bara) and consumed as fuel gas. This high pressure natural gas can be expanded in a turbo-expander such that the cold is provided to the hydrogen liquefier to co-produce LNG and/or LIN.

Natural gas 2 is purified of carbon dioxide and water in purification unit 510 to form stream 512 before being compressed in compressor 520 to form pressurized natural gas 522. Pressurized natural gas 522 is then cooled by aftercooler 525 to remove heat of compression from compressor 520.

For the warm end refrigeration (i.e., temperatures warmer than about −100° C.), pressurized natural gas 522 is then cooled within heat exchanger 345, wherein a first portion of the pressurized natural gas 524 is withdrawn at a first intermediate point of the heat exchanger where it is expanded in turbine 530 to low pressure to form first expanded portion 532, before being warmed in heat exchanger 345 and subsequently sent to the methanol plant to be used as fuel (see lines 32 and 308 of FIG. 2). Alternatively, after exiting aftercooler 525, the pressurized natural gas may be sent directly to the inlet of turbine 530 via line 527 rather than cooling the gas in exchanger 50 for the purpose of limiting the temperature at the discharge of the turbine First expanded portion 532 provides a portion of the refrigeration used to cool and eventually liquefy the natural gas, as well as cooling the hydrogen. The turbine 530 can drive a generator or booster to pre-boost the total natural gas feed as shown, only the natural gas to be liquefied, only the natural gas to be expanded, or to post-boost the natural gas which was expanded.

In an optional embodiment, if the natural gas stream to be liquefied as product LNG contains heavy hydrocarbons such as butane and heavier, it can be withdrawn at a second intermediate point of the heat exchanger and introduced to a liquid/gas separator or distillation column (not shown) to remove heavy hydrocarbons, leaving a top gas that is depleted of heavy hydrocarbons. Top gas is reintroduced into the intermediate and/or cold end of heat exchanger, wherein it is further cooled and liquefied to form liquefied natural gas (LNG) 46.

Figure 7:
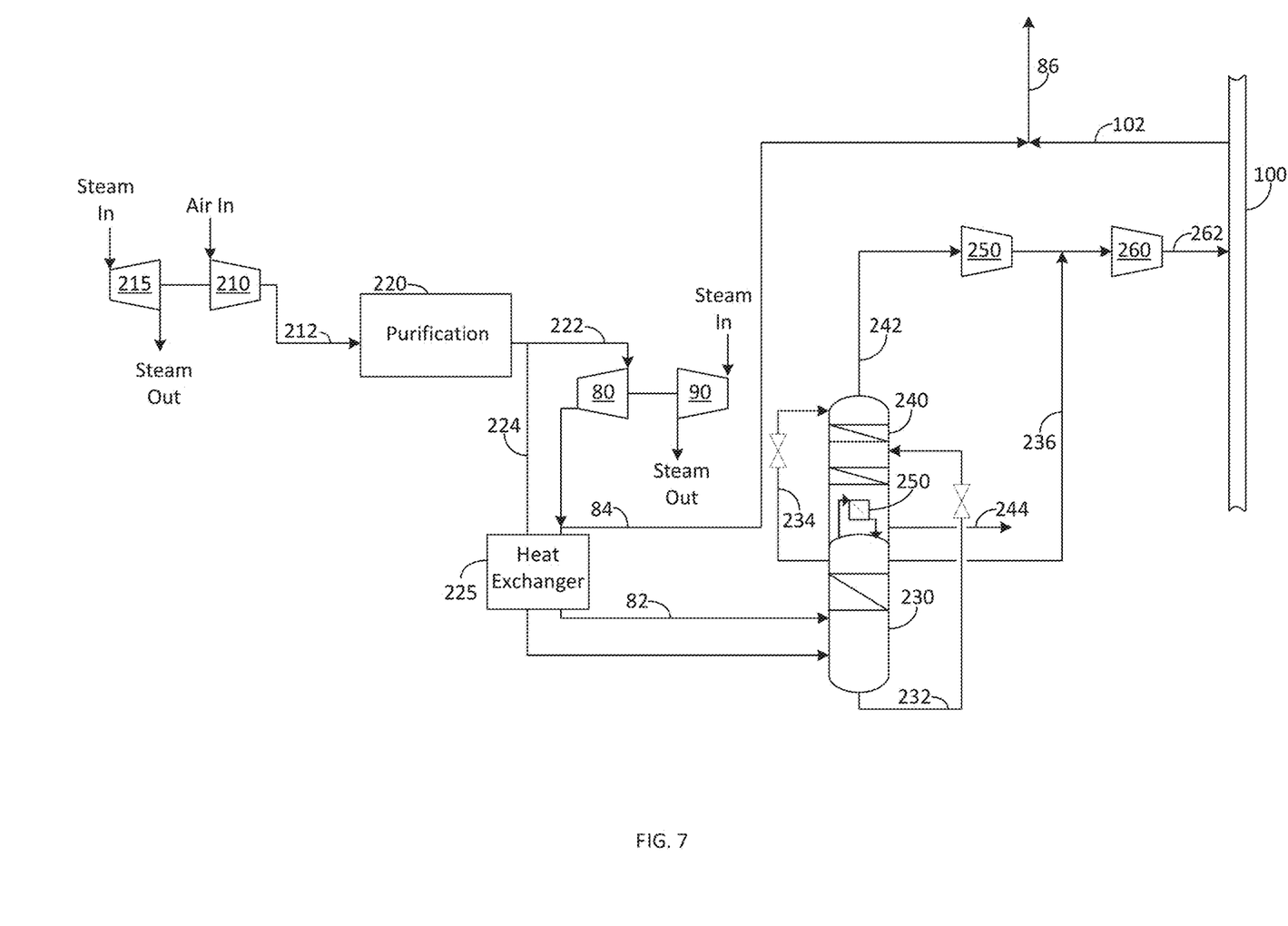

FIG. 7 provides a schematic representation of an optional air separation unit in accordance with an embodiment of the invention. Air is compressed in main air compressor (MAC) 210, which can be driven by a motor (not shown) or by steam turbine 215, particularly if excess steam is available, to produce compressed air 212. Compressed air 212 is then purified in purification unit 220 to remove components that will freeze at cryogenic temperatures (e.g., carbon dioxide and water). From there, compressed air 212 can be split into a first portion 222 and a second portion 224, is the second portion 224 being cooled in heat exchanger 225 and then introduced to the double distillation column. The first portion 222 is further compressed in booster air compressor (BAC) 80 with a first fraction 82 being cooled in the ASU heat exchanger 225 before being introduced into medium pressure column 230. The remaining boosted air stream 84 is sent to the liquefier as described in FIG. 2, either alone or combined with nitrogen stream 102 from nitrogen pipeline 100 (e.g., nitrogen-air mixture 86).

The double distillation column shown is a typical double distillation column in an air separation unit comprising a lower pressure column 240, a shared condenser/reboiler 250, and the higher pressure column 230. A bottoms liquid 232 rich in oxygen is expanded across a valve before being introduced into lower pressure column 240 for further separation. Nitrogen stream 234 is also introduced as reflux. Liquid oxygen stream 244 is produced at a bottom section of lower pressure column 240 as product or vaporized in ASU heat exchanger 225 for gaseous oxygen production. A low pressure nitrogen stream 242 is produced at the top of low pressure column 240, and medium pressure nitrogen stream 236 is produced at a top portion of higher pressure column 230.

In one embodiment, low pressure nitrogen stream 242 can be further compressed by compressor 250 and combined with medium pressure nitrogen stream 236, and then compressed by compressor 260 to form high pressure nitrogen 262, which can then be introduced to nitrogen pipeline 100. Alternatively, a portion of high pressure nitrogen 262 can be sent directly to the liquefier of FIG. 1 without first going to nitrogen pipeline 100.

Table I below presents a comparison of various compressors utilized in one method known in the prior art as compared to certain embodiments of the present invention. As is clearly shown, certain embodiments of the present invention do not require a hydrogen recycle compressor, a nitrogen recycle compressor, or a hydrogen process inlet compressor. This results in a substantial savings in equipment costs.

TABLE I

CAPEX Comparison of Standard Hydrogen Liquefier and Embodiments of the Present Invention

| Compressor | Compressor Size | Prior Art | Embodiments of the Invention |
|---|---|---|---|
| $H_2$ Recycle | Large | Required | None |
| $N_2$ Recycle | Large | Required | None |
| $H_2$ Process Inlet | Small | Depends on $H_2$ Source | None |
| $H_2$ Cycle Feed | Small | Required | Site Dependent |
| $N_2$ Cycle Feed | Small | Required | Site Dependent |

In a typical stand alone hydrogen liquefier, the power requirements for producing liquid hydrogen are approximately 12 kWh/kg liquid hydrogen. The theoretical Quack Ne/He scheme was estimated to be 5-7 kWh/kg liquid hydrogen. However, embodiments of the present invention provide much better results. For example, the embodiment shown in FIG. 4 results in about 4.2 kWh/kg liquid hydrogen. The primary power used is for nitrogen compression from underutilized nitrogen pipeline capacity. The embodiment shown in FIG. 5 uses about 0.9 kWh/kg liquid hydrogen, with the power usage being attributed to low pressure nitrogen flash losses. The embodiment shown in FIG. 6 can liquefy hydrogen using "zero energy" (e.g., 0 kWh/kg produced liquid hydrogen) and about 0.2 kWh/kg LNG compared to 0.5 to 0.7 kWh/kg LNG of a typical small LNG unit.

As used herein, warm temperature cooling is defined as cooling conducted at temperatures that are warmer than the freezing point of any impurities within the hydrogen stream to be liquefied that are removed within the hydrogen purification units. Similarly, cold temperature cooling is defined as cooling conducted at temperatures that are colder than the freezing point of any impurities within the hydrogen stream to be liquefied that are removed within the hydrogen purification units. It is also understood for hydrogen liquefaction that warm refrigeration is temperatures above liquid nitrogen at near atmospheric pressure (i.e., ~−190° C.), which is differentiated since nitrogen refrigeration at this level can be provided at a lower cost than that of lower temperatures −190° C. to −252° C., which requires more expensive refrigeration from refrigerant systems such as hydrogen, helium, neon/helium, etc.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps or devices can be combined into a single step/device.

The singular forms "a", "an", and "the" include plural referents, unless the context clearly dictates otherwise. The terms about/approximately a particular value include that particular value plus or minus 10%, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. A method for liquefying a pressurized hydrogen gas originating from a pressure swing adsorber unit, the method comprising the steps of:
   withdrawing a hydrogen containing gas from a methanol production unit;
   introducing the hydrogen containing gas to the pressure swing adsorber (PSA) unit under conditions effective for purifying the hydrogen containing gas to produce a purified hydrogen stream; and
   sending the purified hydrogen gas to a hydrogen liquefaction unit under conditions effective for the liquefaction of hydrogen thereby producing a liquefied hydrogen stream, wherein the purified hydrogen gas is sent from the PSA unit to the hydrogen liquefaction unit, wherein there is an absence of a motor-driven compressor downstream the PSA unit and upstream the liquefaction unit, such that the purified hydrogen gas is sent from the PSA unit to the liquefaction unit without using the motor-driven compressor,
   wherein the hydrogen liquefaction unit is configured to provide a first refrigeration source and a second refrigeration source, wherein the first refrigeration source provides refrigeration using expansion of a high pressure nitrogen stream, wherein the second refrigeration source provides refrigeration using expansion of the purified hydrogen gas stream to produce a warm hydrogen gas stream.

2. The method as claimed in claim 1, wherein the PSA unit is part of an existing methanol facility or is an add-on PSA to the existing methanol facility.

3. The method as claimed in claim 1, wherein the high pressure nitrogen is expanded in one or more turboexpanders.

4. The method as claimed in claim 3, wherein the one or more turboexpanders are arranged in series with each other.

5. The method as claimed in claim 3, wherein the one or more turboexpanders are arranged in parallel with each other.

6. The method as claimed in claim 3, wherein the high pressure nitrogen is expanded to a pressure of at least 4 bara and utilized as a utility gas.

7. The method as claimed in claim 1, wherein warm hydrogen gas stream is used as a fuel gas within the methanol production unit.

8. The method as claimed in claim 1, wherein the second refrigeration source comprises:
   expanding a first portion of the high pressure hydrogen gas stream in a first expansion turbine to a first pressure; and
   expanding a second portion of the high pressure hydrogen gas stream in a second expansion turbine to a second pressure,
   wherein the first pressure is higher than the second pressure.

9. The method as claimed in claim 1, wherein the first refrigeration source provides warm temperature cooling and the second refrigeration source provides cold temperature cooling.

10. The method as claimed in claim 1, wherein a third source of refrigeration is provided using natural gas letdown energy.

11. The method as claimed in claim 10, wherein the third refrigeration source provides warm temperature cooling.

12. The method as claimed in claim 1, wherein a fourth source of refrigeration is provided using letdown energy of an air gas originating from an air separation unit (ASU), wherein the air gas comprises compressed air from a booster air compressor within the ASU.

13. The method as claimed in claim 12, wherein the air gas originating from the ASU further comprises a nitrogen stream, such that the composition of the air gas is at or below a combustibility limit of oxygen in methane or hydrogen.

14. The method as claimed in claim 1, wherein the purified hydrogen stream is at a pressure of at least 15 bara.

15. A method for producing liquid hydrogen, the method comprising the steps of:
introducing pressurized natural gas from a high pressure natural gas pipeline to a gas processing unit under conditions effective for producing a purified hydrogen stream; and
introducing the purified hydrogen stream to a hydrogen liquefaction unit under conditions effective to produce a liquid hydrogen stream, wherein the purified hydrogen gas is sent from the gas processing unit to the hydrogen liquefaction unit, wherein there is an absence of a motor-driven compressor downstream the PSA unit and upstream the liquefaction unit, such that the purified hydrogen gas is sent from the PSA unit to the liquefaction unit without using the motor-driven compressor,
wherein the hydrogen liquefaction unit provides a warm temperature cooling and a cold temperature cooling to the purified hydrogen stream,
wherein the warm temperature cooling is provided by utilizing letdown energy of a pressurized stream selected from the group consisting of a nitrogen stream sourced from a nitrogen pipeline, liquid nitrogen, a natural gas stream sourced from the high pressure natural gas pipeline, an air gas sourced from an air separation unit, and combinations thereof,
wherein the cold temperature refrigeration is provided by utilizing letdown energy of the purified hydrogen stream.

16. The method as claimed in claim 15, wherein the gas processing unit comprises a methanol production plant.

17. The method as claimed in claim 15, wherein the gas processing unit comprises an ammonia production plant.

18. The method as claimed in claim 15, wherein argon and/or nitrogen are removed from a first portion of the purified hydrogen stream being liquefied and a second portion of the purified hydrogen stream used to provide the cold temperature refrigeration in a common adsorber unit.

19. The method as claimed in claim 15, wherein the cold temperature refrigeration is provided by at least two turbines operating in a series arrangement.

20. The method as claimed in claim 19, wherein one or more of the at least two turbines are configured to drive one or more boosters, wherein the one or more boosters are used to pressurize the purified hydrogen stream, the expanded pressurized hydrogen stream or combination thereof.

21. The method as claimed in claim 15, wherein the cold refrigeration provided by the letdown of hydrogen is provided by three turbines, wherein, hydrogen is expanded in a first turbine producing a first expanded hydrogen stream, a first portion of the first expanded hydrogen stream is further expanded in a second turbine producing a second expanded hydrogen stream, a second portion of the first expanded hydrogen stream is cooled and expanded in a third turbine producing a third expanded hydrogen stream, wherein the second and third expanded hydrogen streams are warmed by heat exchange with the hydrogen stream being cooled.

22. The method as claimed in claim 21, wherein the second and third expanded hydrogen streams are combined before or during the warming step.

23. The method as claimed in claim 21, wherein the hydrogen to the first turbine is partially cooled by refrigeration only from hydrogen streams before the first turbine, wherein the hydrogen streams providing the cooling consist of the first, second, and third expanded hydrogen streams, a fourth expanded hydrogen stream, storage tank boil off and combination thereof.

* * * * *